United States Patent [19]

Silverblatt

[11] 4,100,021
[45] Jul. 11, 1978

[54] NUCLEAR REACTOR VESSEL AND INTERNALS ALIGNMENT APPARATUS

[75] Inventor: Bernard L. Silverblatt, Mt. Lebanon, Pa.

[73] Assignee: Westinghouse Electric Corp., Pittsburgh, Pa.

[21] Appl. No.: 733,592

[22] Filed: Oct. 18, 1976

[51] Int. Cl.² .............................................. G21C 13/10
[52] U.S. Cl. ............................................ 176/87; 220/3
[58] Field of Search ...................... 176/87; 220/323, 7, 220/8, DIG. 20, 3; 292/300; 8/DIG. 39; 70/432, 441

[56] References Cited

U.S. PATENT DOCUMENTS

| 2,797,018 | 6/1957 | Worn | 220/328 |
| 3,695,482 | 10/1972 | Smith | 220/3 X |
| 3,867,254 | 2/1975 | Brandstetter | 176/87 |
| 3,963,565 | 6/1976 | Beine | 176/87 X |
| 3,987,860 | 10/1976 | Jabsen | 176/87 |
| 3,994,776 | 11/1976 | Keller | 176/87 X |

FOREIGN PATENT DOCUMENTS

| 936,170 | 9/1963 | United Kingdom | 176/87 |
| 1,247,689 | 9/1971 | United Kingdom | 176/87 |

*Primary Examiner*—Peter A. Nelson
*Attorney, Agent, or Firm*—Edward L. Levine; Z. L. Dermer

[57] ABSTRACT

Apparatus for aligning a nuclear reactor vessel, vessel head, core barrel and upper support structure. The apparatus includes mating extensions and receptacles that not only align and assure proper lateral orientation and stability of the reactor components during operation, but also provide alignment of the vessel head and upper support structure when removed from the reactor simultaneously.

8 Claims, 7 Drawing Figures

NUCLEAR REACTOR VESSEL AND INTERNALS ALIGNMENT APPARATUS

BACKGROUND OF THE INVENTION

1. Field of the Invention

This invention relates to nuclear reactors, and more particularly to apparatus for aligning and maintaining torsional and lateral stability among the reactor vessel and internals structures.

2. Description of the Prior Art

A typical nuclear reactor includes a reactor vessel, a reactor vessel head sealingly engaging the vessel, and reactor internals structures which support a nuclear core within the vessel and align and guide reactor components, instrumentation, and coolant flow. In many reactors the internals include a core barrel supported from the vessel, which barrel radially surrounds the core and is affixed to a lower core support structure. Similarly, an upper core support structure, supported by the reactor vessel and/or the vessel head is positioned above the reactor core to align core components, guide and position instrumentation, and provide top support for core components thereby alleviating undue upward motion. Fine tolerances must be maintained among the various reactor components, to provide, for example, proper lateral alignment and torsional and lateral stability to alleviate undue stress on the components such as the upper support structure. In the prior art, such functions have typically been performed by several pins affixed to a flange of the core barrel, each of which pins both upwardly engage aligned openings in the upper support structure and vessel head, and downwardly engage the reactor vessel.

This pin arrangement, while providing alignment when the reactor is completely assembled, provides no such alignment during disassembly for maintenance or refueling. In most reactors, refueling or maintenance operations are initiated by serially removing the vessel head and then the upper core support structure, thereby rendering the core accessible. More advanced reactor designs, however, provide for simultaneous removal of the vessel head and upper support structure. This type of reactor is described in U.S. Pat. No. 3,836,429, in the name of Erling Frisch et al. With such a reactor, it can be seen that the prior art pin arrangement provides no torsional or lateral stability between the vessel head and upper support structure during the simultaneous removal, as the pins remain with the core barrel. This deficiency could lead to undesirable rocking or pendulum action during movement of the head and upper support structure, as well as misalignment and increased stress during the period of time these structures are removed from the vessel.

It is therefore desirable to provide apparatus which will maintain relative component alignment and stability not only during reactor operation, but also during disassembly. Such apparatus should ideally be compatible with existing reactor designs, add minimally to manufacturing processes and costs, and not add any steps or additional time to the disassembly process.

SUMMARY OF THE INVENTION

This invention provides apparatus which will provide such alignment and stability during reactor disassembly as well as during normal assembled operation. Accordingly, it provides a lower aligning structure which aligns the core barrel, vessel, and upper support structure as well as an upper aligning structure aligning the upper support structure and vessel head. Thus, upon simultaneous removal of the upper support structure and head, torsional stability and alignment are maintained between these components.

In the preferred embodiment, the lower aligning structure includes an extension above (upward) and below (downward) the core barrel flange; the extension matingly engages a slot or keyway in the reactor vessel below the barrel flange, and matingly engages a keyway or opening in the upper aligning structure above the barrel flange. The upper aligning structure includes, in addition to the keyway or opening, an upper extension above the upper support structure that matingly engages a slot or keyway in the vessel head.

Thus, when the head and upper support structure are simultaneously lifted, the upper aligning structure extension maintains engagement with the keyway in the vessel head, thereby providing torsional and lateral alignment and stability between the upper support structure and head.

To reassemble the reactor, the upper support structure and head are simultaneously lowered such that the opening in the upper aligning structure is fitted about the upward extension in the lower aligning structure. A plurality of aligning structures may be used about the reactor vessel circumference.

The invention also provides the ability to remove the core barrel from the vessel, if desirable. Under such conditions, alignment upon reassembly is provided by engaging the downward extension below the core barrel flange with the slot or keyway in the reactor vessel.

BRIEF DESCRIPTION OF THE DRAWINGS

The functions and advantages of this invention will become more apparent from the following description taken in connection with the accompanying drawings, in which.

DESCRIPTION OF THE PREFERRED EMBODIMENTS

Figure 1:
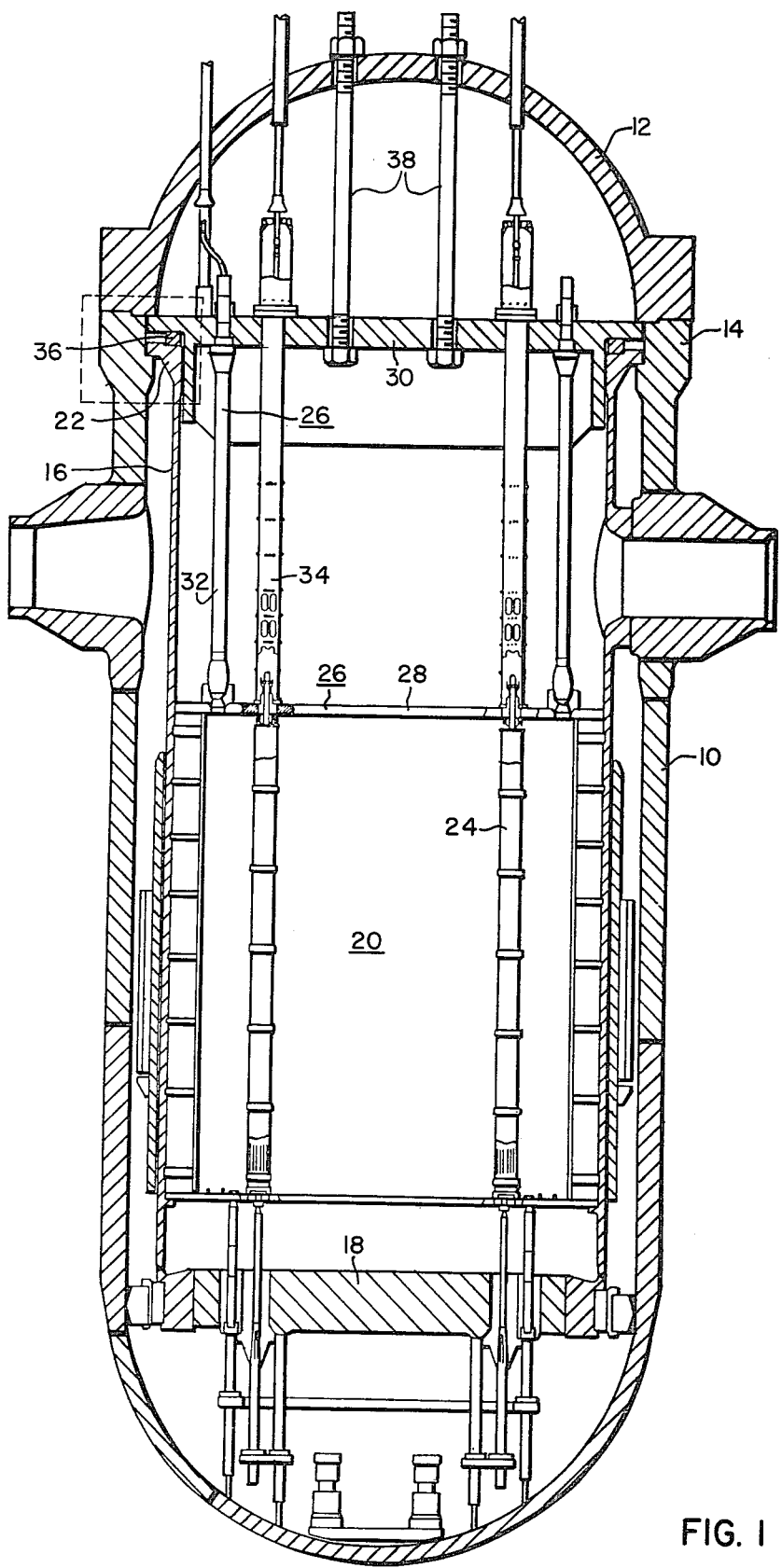
FIG. 1 is an elevational schematic, in partial cross section, of a typical nuclear reactor with which this invention may be utilized.

Referring now to FIG. 1 there is shown a typical nuclear reactor vessel 10 and its internal structures. During plant operation the vessel 10 is sealed by a closure head 12. Supported from a vessel flange 14 is a core barrel 16 affixed at its lower extremity to a support plate 18. The barrel 16 radially surrounds a core 20, the weight of which is transmitted through the support plate 18 and barrel 16, including a core barrel flange 22, to the vessel flange 14.

The core 20 includes a plurality of nuclear fuel assemblies 24 which are restrained from upward motion which may be imparted by the flow of a reactor coolant through the core, by the upper support structure 26.

The upper support structure shown includes an upper core plate 28, an upper support plate 30, support columns 32, and control rod element guide tubes 34. The upper support structure 26 functions to hold down and laterally orient the fuel assemblies 24, and is typically supported through the upper support plate 30 between the core barrel 16 and vessel head 12. Resilient means, such as a circumferential spring 36 are typically interposed between these components. It is of prime importance that all of the above-described components be positioned within fine tolerances.

Figure 2:
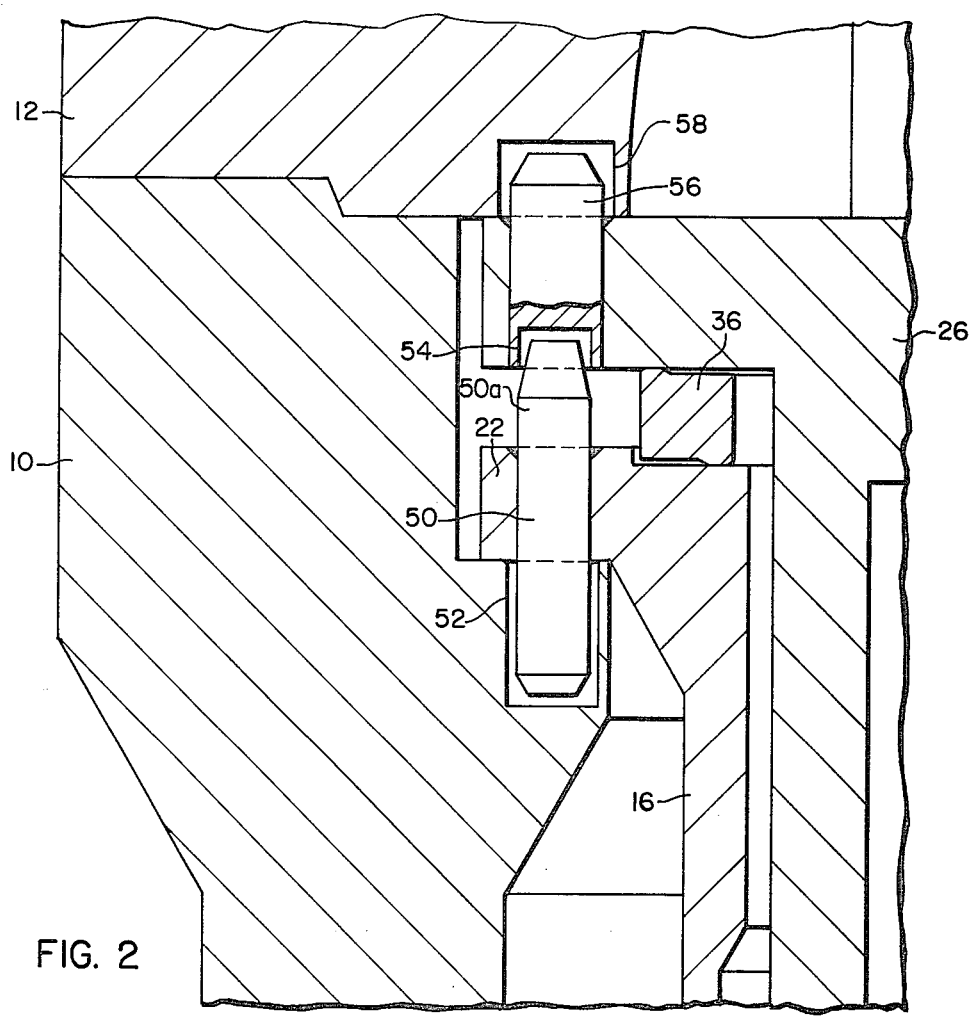
FIG. 2 is a blowup cross-sectional schematic of that portion of FIG. 1 within the dotted line, additionally showing one embodiment of the invention.

The foregoing background description will provide a better understanding of this invention, which provides apparatus for aligning and maintaining torsional and lateral stability among the vessel 10, core barrel 16, upper support structure 26, and vessel head 12 during assembly and also during disassembly of the reactor. One embodiment is illustrated in FIG. 2, which shows lower means for laterally aligning the vessel 10, core barrel 16, and upper support structure, and upper means for laterally aligning the support structure 26 and vessel head 12. The upper aligning means insure that stability between the head 12 and support structure 26 will be maintained when lifted simultaneously such as through columns 38 (FIG. 1). The weight of the upper support structure 26 is transferred through the columns 38 to the vessel head 12 during the lift; the entire head and upper support structure assembly is lifted from an attachment to the vessel head (not shown).

Figure 2A:
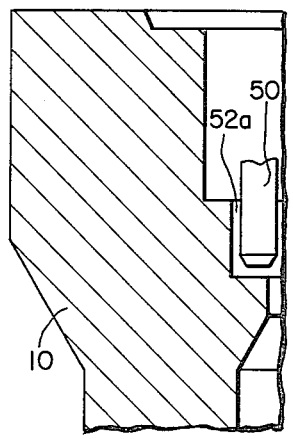
FIG. 2a is a sectional elevation view illustrating part of another embodiment of the invention.
Figure 5:
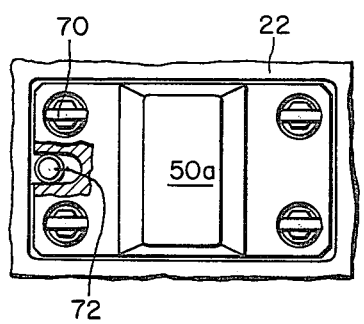
FIG. 5 is a view, in section, taken at V—V of FIG. 4.
Figure 6:
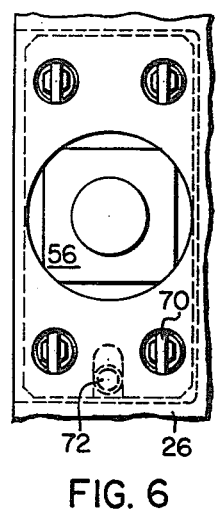
FIG. 6 is a view taken at VI—VI of FIG. 3.
Figure 3:
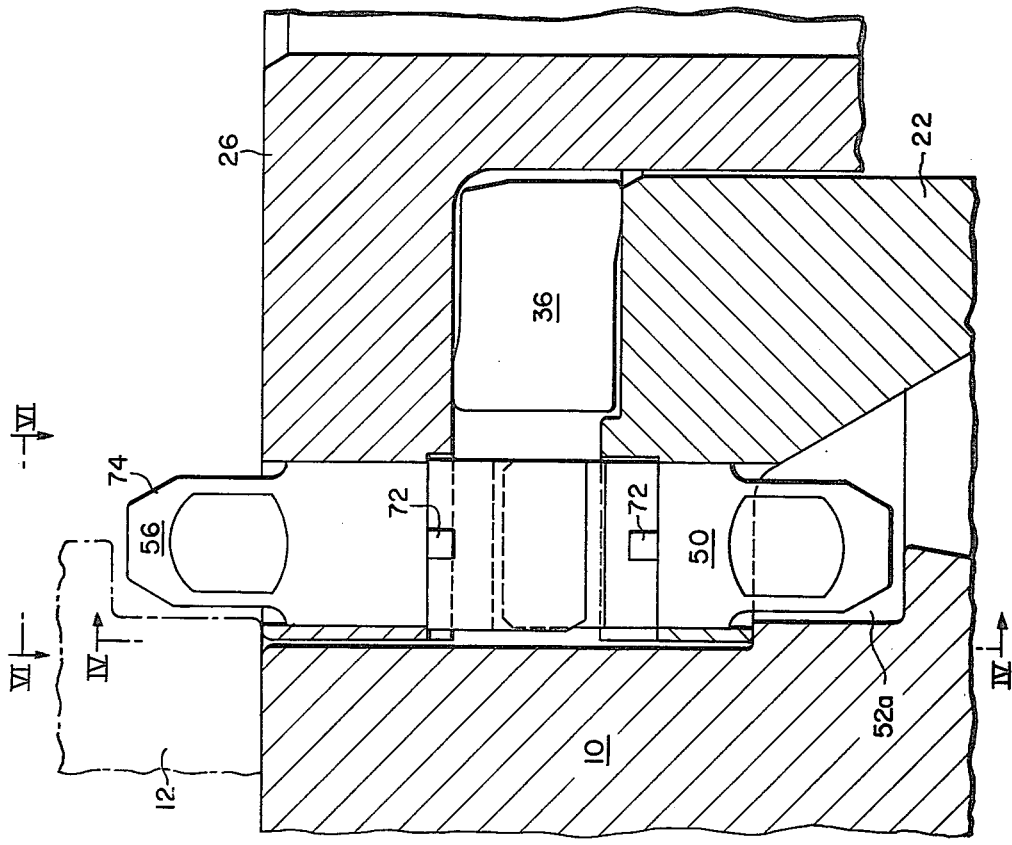
FIG. 3 is an elevation view, in section illustrating additional detail of one embodiment of the invention.

The lower means for aligning as shown in FIG. 2 includes an extension 50, affixed to the core barrel flange 22, which matingly engages a keyway or opening or slot 52 in the reactor vessel 10. Similarly, the extension 50 engages another opening or slot or keyway 54 in the upper support structure 26. In the embodiment shown in FIG. 2, the portion 50a of the extension above the core barrel flange 22 directly engages the upper aligning means, discussed below. Although such orientation is preferred, it is to be understood that the extension portion 50a could similarly directly engage the upper support structure 26. In such orientation, the upper and lower aligning means would be at different circumferential positions about the vessel. It is also to be understood that although one aligning apparatus is illustrated, a plurality of the same may be spaced about the vessel 10 circumference. Preferably four aligning apparatus will be spaced at ninety degree intervals about the vessel circumference. Further, although the slot 52, for example, is shown in FIG. 2 as being positioned within the vessel wall, it may similarly be a cutout 52a as shown in FIG. 2a, and also shown in FIG. 3. This preferred orientation will allow for thermal expansion under operating conditions.

Referring again to FIG. 2, the upper aligning means illustrated includes an extension 56 affixed to the upper support structure 26 which matingly engages an enclosed or open-ended keyway or slot 58 in the vessel head 12. It further comprises the opening or keyway 54, sized to matingly engage the extension 50. As discussed above, the opening 54 may also be provided directly in the upper support structure 26.

During reactor assembly, it will be seen that the extension 50 affixed to the core barrel 16 will engage the vessel slot 52, as well as the upper support structure slot 54, aligning the three components. The upper support structure 26 will also be aligned with the head 12 by extension 56. During disassembly, such as for reactor refueling or maintenance, the head 12 and upper support structure 26 may be separately lifted, or simultaneously lifted. In the latter case, the extension 56 will maintain lateral and torsional stability between the head and upper support structure throughout removal from the reactor. Also, if desired, the core barrel 16 may be removed from the vessel 10.

Figure 4:
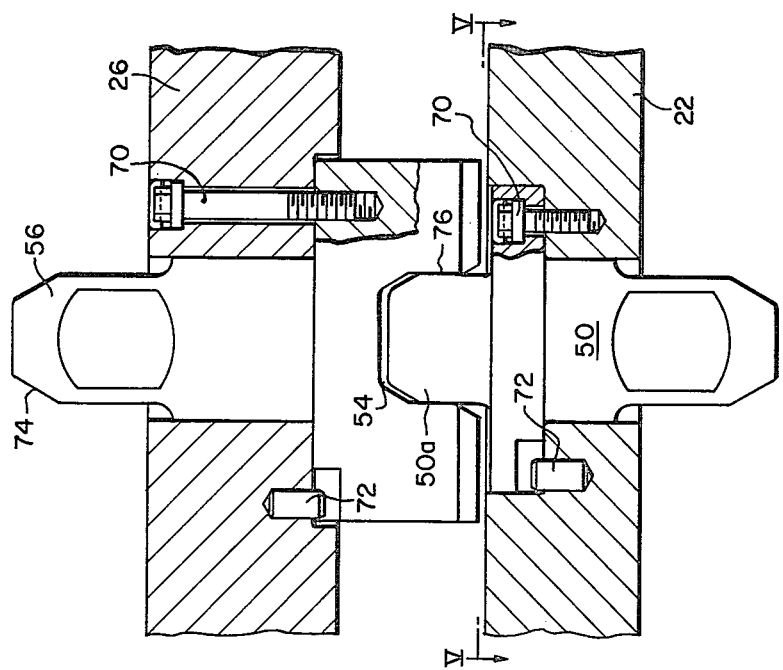
FIG. 4 is a sectional view, taken at IV—IV of FIG. 3.

FIGS. 3 through 6 illustrate details of a preferred structure of the invention. FIG. 4 illustrates the attachment of extension 56 to the upper support structure 26 and of extension 50 to the core barrel flange 22. Both attachments include cap screws 70 and dowel pins 72. The preferred shape of the extension upper portion 50a is shown best in FIG. 5, being essentially rectangular with beveled edges. The preferred shape of the lower portion of extension 50 and of extension 56 is shown best in FIGS. 3 and 6. These extensions are preferably of circular cross section at their extremities, tapering into a rectangular or square cross section. The beveled or tapering edges 74 are preferably at 30° from vertical, and the clearance between extension 50a and opening 54 (FIG. 4), designated by reference numeral 76, is preferably between 0.029 and 0.036 inches, to assure proper alignment between the core 20, supported by the core barrel 16, and the upper support structure 26.

There has therefore been described apparatus for maintaining alignment among reactor components during reactor operation as well as disassembly. It will be apparent that many modifications and variations are possible in view of the above teachings. It therefore is to be understood that within the scope of the appended claims, the invention may be practiced other than as specifically described.

I claim:

1. An improved nuclear reactor of the type having a reactor vessel, a reactor vessel head supported atop said vessel, a core barrel including a flange supported within said vessel, and an upper support structure supported between said core barrel flange and said head, wherein the improvement comprises:

apparatus for laterally aligning said vessel, head, flange, and support structure, said apparatus including lower keyed means for aligning said flange, support structure and vessel, and upper keyed means for laterally aligning said support structure and head, said upper keyed means maintaining alignment of said support structure and head upon their simultaneous removal from said core barrel and vessel.

2. The nuclear reactor of claim 1, wherein said lower aligning means includes a lower extension permanently affixed to said flange and said upper aligning means includes an upper extension affixed to said support structure.

3. The nuclear reactor of claim 1, wherein said lower aligning means comprises an extension above and below said flange, said extension affixed to said flange and matingly engaging said vessel below said flange and matingly engaging said support structure above said flange.

4. The nuclear reactor of claim 1, wherein said upper aligning means comprises an extension affixed to said support structure matingly engaging said head.

5. The nuclear reactor of claim 1, wherein said lower aligning means matingly engages said upper aligning means.

6. A nuclear reactor comprising:
(a) a reactor vessel including a vessel flange having a keyway therein;

(b) a core barrel supported by and atop said vessel flange, said barrel having a lower and upper extension, said lower extension sized to matingly engage said vessel keyway;

(c) an upper support structure supported by and atop said core barrel, said support structure having a lower opening sized to matingly receive said upper extension, said support structure also having an upper protrusion; and (d) a reactor vessel head supported by and atop said vessel and said upper support structure, said head having a cavity sized to matingly receive said protrusion.

7. The nuclear reactor of claim 6, further comprising resilient means interposing said barrel and said upper support structure.

8. A nuclear reactor comprising:

(a) a reactor vessel;

(b) a reactor vessel head sealingly engaging said vessel;

(c) a core barrel positioned within said vessel;

(d) an upper support positioned at least partially above said core barrel;

(e) upper aligning means cooperatively engaging said support structure and said head including a protrusion affixed to one of said support structure and head cooperatively engaging a receptacle in the other of said support structure and head; and (f) lower aligning means cooperatively engaging said vessel, barrel, and support structure including an extension affixed to one of said vessel, barrel, and support structure cooperatively engaging a cavity in each of the other of said vessel, barrel and support structure.

* * * * *